(12) United States Patent
Ozaki et al.

(10) Patent No.: US 7,591,429 B2
(45) Date of Patent: Sep. 22, 2009

(54) ALBUM PROVIDING SYSTEM WITH FUNCTION OF REGISTERING/ DISTRIBUTING CONTENTS AND CALENDAR PROVIDING SYSTEM WITH FUNCTION OF REGISTERING/ REGENERATING CONTENTS

(75) Inventors: Hiroshi Ozaki, Tokyo (JP); Katsuo Ogura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 595 days.

(21) Appl. No.: 11/235,113

(22) Filed: Sep. 27, 2005

(65) Prior Publication Data

US 2006/0065712 A1 Mar. 30, 2006

(30) Foreign Application Priority Data

Sep. 28, 2004 (JP) ............................. 2004-282655
Sep. 29, 2004 (JP) ............................. 2004-285111

(51) Int. Cl.
*G06K 9/36* (2006.01)
*G06F 7/00* (2006.01)

(52) U.S. Cl. ................. 235/462.1; 707/104.1
(58) Field of Classification Search .............. 235/462.1; 707/104.1; 715/500.1

See application file for complete search history.

(56) References Cited

U.S. PATENT DOCUMENTS 6,760,884 B1 * 7/2004 Vertelney et al. ............ 715/202
2004/0088326 A1 * 5/2004 Lin et al. .................. 707/104.1

FOREIGN PATENT DOCUMENTS

JP 2003-111009 A 4/2003
JP 2004-206447 A 7/2004

* cited by examiner

*Primary Examiner*—Daniel A Hess
(74) *Attorney, Agent, or Firm*—Birch, Stewart, Kolasch & Birch, LLP (57) ABSTRACT

An album providing system with a function of registering/distributing contents, having a contents registration/distribution apparatus comprising a registration unit which accepts registration of contents, and a distribution unit which distributes the registered contents and an album generation apparatus with the function of registering/distributing contents comprising an image input unit which inputs an image, a two-dimensional code issue unit which associates with the image and issues a two-dimensional code having an embedded access destination to the contents registration/distribution apparatus, and a print unit which prints an album in which a two-dimensional code corresponding to the image is arranged near the image.

5 Claims, 10 Drawing Sheets

| IDENTIFICATION INFORMATION | CONTENTS |
|---|---|
| QR001 | voice1.wav |
| QR002 | movie1.avi |
| QR003 | voice2.wav |
| QR004 | |
| ⋮ | ⋮ |

OCTOBER, 2004 — 502

| SUN. | MON. | TUE. | WED. | THU. | FRI. | SAT. |
|------|------|------|------|------|------|------|
|      |      |      |      |      | 1    | 2    |
| 3 (D3, r3) | 4 (p3) | 5 | 6 | 7 | 8 | 9 |
| 10 (D10, r10) | 11 (p10) | 12 | 13 | 14 | 15 | 16 |
| 17 (D17, r17) | 18 (p17) | 19 | 20 | 21 | 22 | 23 |
| 24 (D24, r24) | 25 (p24) | 26 | 27 | 28 | 29 | 30 |
| 31 (D31, r31) | (p31) |  |  |  |  |  |

FIG.9

| OCTOBER, 2004 | |
|---|---|
| DAY | CONTENTS DATA |
| 3 | Voice3.wav |
| 10 | Voice10.wav |
| ⋮ | ⋮ |

ALBUM PROVIDING SYSTEM WITH FUNCTION OF REGISTERING/ DISTRIBUTING CONTENTS AND CALENDAR PROVIDING SYSTEM WITH FUNCTION OF REGISTERING/ REGENERATING CONTENTS

BACKGROUND OF THE INVENTION

1. Field of the Invention

The present invention relates to an album providing system with the function of registering/distributing contents and a calendar providing system with the function of registering/ regenerating contents, and more specifically to a system capable of registering and regenerating contents corresponding to an image or a calendar included in an album.

2. Related Art

Conventionally, a technique of obtaining an album by arranging images taken by various imaging devices in a desired order has been disclosed. For example, an electronic album editing device according to Japanese Patent Application Laid Open No. 2003-111009 includes an image/audio data I/F device for capturing image data and audio data corresponding to the image data, a recording device for managing and storing image data and the audio data, an audio data conversion device for converting audio data to text data, a retrieval and sort device for retrieving and sorting image data based on the text data, and an album generation device for generating an album by arranging an image based on a sort result.

Also, there has been a technique developed to obtain desired audio information from two-dimensional code data printed on various printing media. For example, the two-dimensional code device according to Japanese Patent Application Laid Open No. 2004-206447 divides input information, and the information obtained by the dividing process is represented by a two-dimensional code and output, thereby obtaining a plurality of two-dimensional codes. These two-dimensional codes are read by a two-dimensional code regeneration device to obtain restored information. For example, information can be easily captured to a mobile telephone by producing a program to use a mobile telephone as a two-dimensional code regeneration device, and information such as image information about a standby screen, audio information about ringing tone, information operating on a mobile telephone, etc. In addition, the sales of publications can be increased by loading a two-dimensional code into sequentially issued publications.

SUMMARY OF THE INVENTION

In the technology of Japanese Patent Application Laid Open No. 2003-111009, voice can only be appreciated by conversion to text. To enjoy voice together with an image, an audio regeneration device such as a speaker, etc. can be provided for an album, but it is not a practical idea because the configuration of an album is complicated and requires an additional operation, and the cost of generating an album increases.

In the technology of Japanese Patent Application Laid Open No. 2004-206447, a two-dimensional code in which audio contents irrelevant to the intention and the convenience of a user is embedded automatically is loaded into a publication, etc. and provided for a user, but the user cannot optionally change the information to be captured according to the convenience of the user. Furthermore, since the information to be captured is fixed, a two-dimensional code from which information is once captured is useless.

An object of the present invention is that a person can easily appreciate image and audio without providing special device in an album.

Another object of the present invention is providing freely generating information to be captured from a two-dimensional code according to the convenience of a user.

To solve the above-mentioned problems, the album providing system with the function of registering/distributing contents according to the present invention includes: a contents registration/distribution apparatus including a registration unit which accepts registration of contents, and a distribution unit which distributes the registered contents; and an album generation apparatus with the function of registering/distributing contents including an image input unit which inputs an image, a two-dimensional code issue unit which associates with the image and issues a two-dimensional code having an embedded access destination to the contents registration/distribution apparatus, and a print unit which prints an album in which a two-dimensional code corresponding to the image is arranged near the image.

A user who generates an album by the album generation apparatus with the function of registering/distributing contents reads a two-dimensional code arranged near an image by a mobile terminal with a two-dimensional code reader such as a mobile telephone, a PDA, etc., accesses a contents registration/distribution apparatus, and can freely register contents by associating desired contents with a desired image. Then, a user who has registered contents or other users access the contents registration/distribution apparatus by reading the two-dimensional code arranged near the image by a mobile terminal with a two-dimensional code reader, and can receive the distribution of registered contents. The contents can be audio or moving pictures that cannot be appreciated by a published album, but can be anything that can be transmitted as data such as a still image, text, etc.

The album generation apparatus with the function of registering/distributing contents according to the present invention generates an album in which an access destination to a contents registration/distribution apparatus including a registration unit which accepts registration of contents, and a distribution unit which distributes the registered contents is embedded, and includes: an image input unit which inputs an image; a two-dimensional code issue unit which associates with the image and issues a two-dimensional code having an embedded access destination to the contents registration/distribution apparatus; and a print unit which prints an album in which a two-dimensional code corresponding to the image is arranged near the image.

The album generating method with the function of registering/distributing contents generates an album in which an access destination to a contents registration/distribution apparatus including a registration unit which accepts registration of contents, and a distribution unit which distributes the registered contents is embedded, and includes: an image inputting step of inputting an image; a two-dimensional code issuing step of associating with the image and issuing a two-dimensional code having an embedded access destination to the contents registration/distribution apparatus; and a printing step of printing an album in which a two-dimensional code corresponding to the image is arranged near the image.

The album generation program with the function of registering/distributing contents is used to direct a computer to generate an album in which an access destination to a contents registration/distribution apparatus including a registration unit which accepts registration of contents, and a distribution unit which distributes the registered contents is embedded, and includes: an image inputting step of inputting an image; a two-dimensional code issuing step of associating with the image and issuing a two-dimensional code having an embedded access destination to the contents registration/distribution apparatus; and a printing step of printing an album in which a two-dimensional code corresponding to the image is arranged near the image.

The album generation program with the function of registering/distributing contents produces the same operation effects as the above-mentioned album generation apparatus with the function of registering/distributing contents. The program can be recorded on a computer-readable recording medium such as CD-ROM, a DVD, an MO, etc.

Also to solve the above-mentioned problems, the calendar providing system with the function of registering/regenerating contents according to the present invention includes: a contents registration/regeneration apparatus including a registration unit which accepts registration of contents corresponding to a year, month, or day, and a regeneration unit which regenerates contents registered corresponding to the year, month, or day; and a calendar generation apparatus with the function of registering/regenerating contents including a two-dimensional registration code issue unit which issues a two-dimensional registration code in which an access destination to the registration unit is embedded, a two-dimensional regeneration code issue unit which issues a two-dimensional regeneration code in which an access destination to the regeneration unit is embedded, and a print unit which prints a calendar in which a two-dimensional registration code and a two-dimensional regeneration code corresponding to the year, month, or day are arranged.

A user who has received a provided calendar accesses the registration unit using a two-dimensional registration code corresponding to the year, month, or day, and can freely register desired contents (voice, audio, moving pictures, a still image, etc.), associating with a desired year, month, or day. A user who has registered voice or audio, or other users access the regeneration unit using a two-dimensional regeneration code corresponding to the year, month, or day, and can receive the regeneration of the registered contents corresponding to the year, month, or day. For example, when the contents are voice or audio, it can be used as an audio memo indicating the schedule by a corresponding date.

The calendar generation apparatus with the function of registering/regenerating contents generates a calendar in which an access destination to a contents registration/regeneration apparatus including a registration unit which accepts registration of contents corresponding to a year, month, or day, and a regeneration unit which regenerates contents registered corresponding to the year, month, or day is embedded, and includes: a two-dimensional registration code issue unit which issues a two-dimensional registration code in which an access destination to the registration unit is embedded; a two-dimensional regeneration code issue unit which issues a two-dimensional regeneration code in which an access destination to the regeneration unit is embedded; and a print unit which prints a calendar in which a two-dimensional registration code and a two-dimensional regeneration code corresponding to the year, month, or day are arranged.

This calendar generation apparatus with the function of registering/regenerating contents generates above stated calendar with the function of registering/regenerating contents.

The album generating method with the function of registering/distributing contents generates a calendar in which an access destination to a contents registration/regeneration apparatus including a registration unit which accepts registration of contents corresponding to a year, month, or day, and a regeneration unit which regenerates contents registered corresponding to the year, month, or day is embedded, and includes: a two-dimensional registration code issuing step of issuing a two-dimensional registration code in which an access destination to the registration unit is embedded; a two-dimensional regeneration code issuing step of issuing a two-dimensional regeneration code in which an access destination to a regenerating step of the contents registration/regeneration apparatus is embedded; and a printing step of printing a calendar in which a two-dimensional registration code and a two-dimensional regeneration code corresponding to the year, month, or day are arranged.

The calendar generation program with the function of registering/regenerating contents is used to direct a computer to generate a calendar in which an access destination to a contents registration/regeneration apparatus including a registration unit which accepts registration of contents corresponding to a year, month, or day, and a regeneration unit which regenerates contents registered corresponding to the year, month, or day is embedded, and includes: a two-dimensional registration code issuing step of issuing a two-dimensional registration code in which an access destination to the registration unit is embedded; a two-dimensional regeneration code issuing step of issuing a two-dimensional regeneration code in which an access destination to a regenerating step of the contents registration/regeneration apparatus is embedded; and a printing step of printing a calendar in which a two-dimensional registration code and a two-dimensional regeneration code corresponding to the year, month, or day are arranged.

A user who has generated an album by the album generation apparatus, method or program with the function of registering/distributing contents reads a two-dimensional code arranged near an image by a mobile terminal with a two-dimensional code reader such as a mobile telephone, a PDA, etc., accesses a contents registration/distribution apparatus, and can freely register contents by associating desired contents with a desired image. Then, a user who has registered contents or other users access the contents registration/distribution apparatus by reading the two-dimensional code arranged near the image by a mobile terminal with a two-dimensional code reader, and can receive the distribution of registered contents.

A user who has received a provided calendar by the calendar generation apparatus, method, or program with the function of registering/regenerating contents accesses the registration unit using a two-dimensional registration code corresponding to the year, month, or day, and can freely register desired contents (voice or audio, moving pictures, a static or a still image, etc.), associating with a desired year, month, or day. A user who has registered voice or audio, or other users access the regeneration unit using a two-dimensional regeneration code corresponding to the year, month, or day, and can receive the regeneration of the registered contents corresponding to the year, month, or day.

DETAILED DESCRIPTION OF THE PREFERRED EMBODIMENTS

The preferred embodiments of the present invention are described below by referring to the attached drawings.

First Embodiment

[General Configuration]

Figure 1:
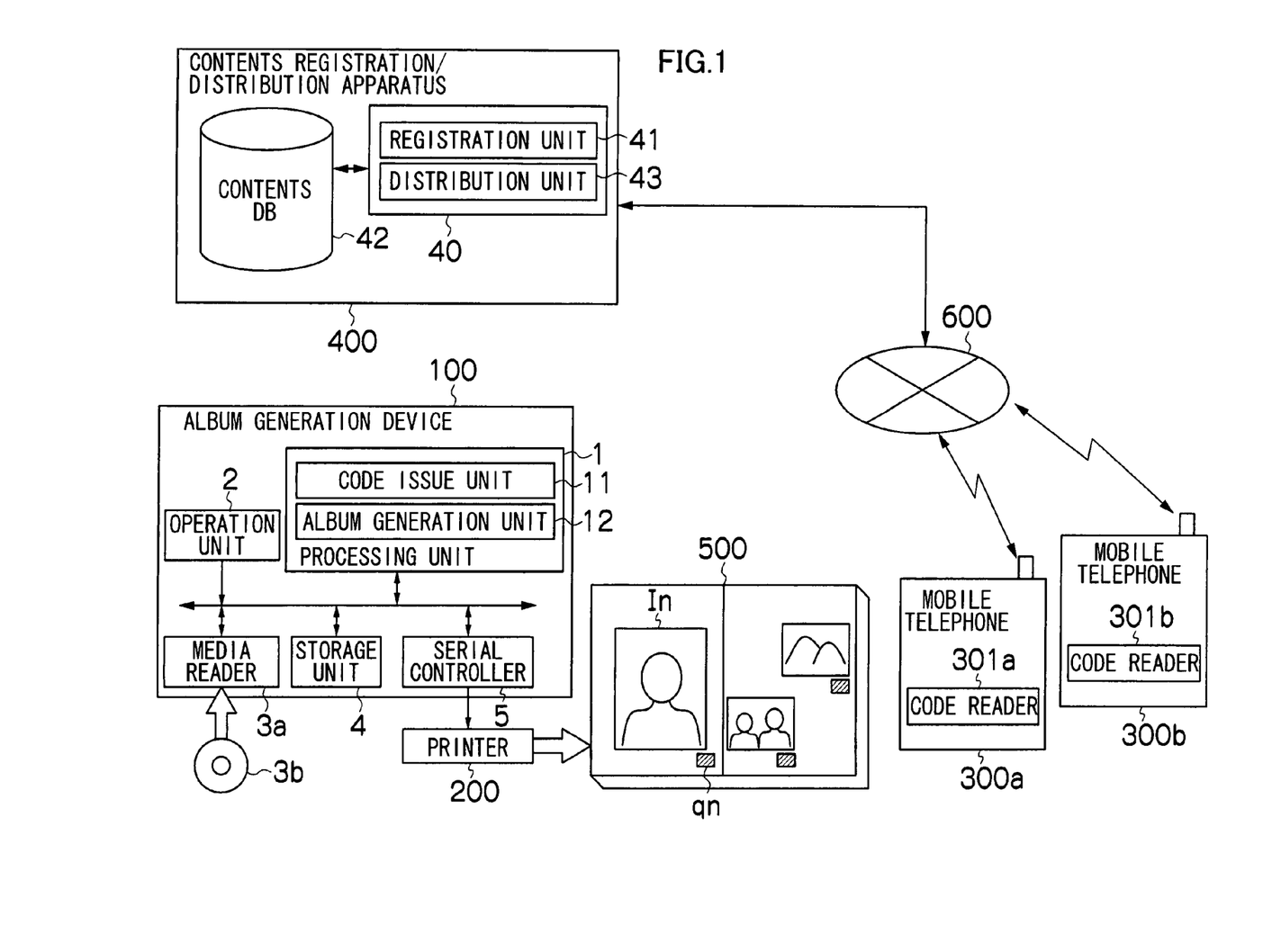
FIG. 1 shows the configuration of the general functions of the album providing system with the function of registering/distributing contents.

FIG. 1 shows the configuration of the general functions of the album providing system with the function of registering/distributing contents according to a preferred embodiment of the present invention. The system comprises an album generation device 100 and a contents registration/distribution apparatus 400. The contents registration/distribution apparatus 400 is connected to mobile telephones 300a and 300b through a network 600. The mobile telephones 300a and 300b can access the contents registration/distribution apparatus 400 by reading a two-dimensional code qn printed near the image In (n=1, 2, . . . ) printed on an album 500 by a code reader 300a. The mobile telephones 300a and 300b are not specifically different from each other in hardware configuration except that they are held by different users, and they are interchangeable. Unless otherwise specified, the mobile telephones 300a and 300b are collectively represented by a mobile telephone 300. The album 500 is generated by the album generation device 100, and the completed album 500 is provided for a user with or without charge.

The album generation device 100 comprises a processing unit 1 configured by a CPU, an operation unit 2 configured by a pointing device, a keyboard, etc., a media reader 3a for reading data such as image data, etc. from various storage media 3b such as CompactFlash, SmartMedia, CD-ROM, a DVD, etc. and inputting the data to the processing unit 1 and a storage unit 4, the storage unit 4 configured by semiconductor memory, a hard disk, etc. and a serial controller 5 for connection of the processing unit 1. The input style of an image is not specifically restricted, but a digital camera and a scanner not shown in the attached drawings can be connected to the album generation device 100 by a USB and an SCSI to input an image.

An album generation unit 12 as a program executed by the processing unit 1 accepts selection of the image In loaded into the album from among the input images and specification of the layout (a page on which the image is shown, the position on the page, etc.) to the album of the selected image In. A code issue unit 11 as a program executed by the processing unit 1 allows the operation unit 2 to specify the image In corresponding to the two-dimensional code, and issues the two-dimensional code qn corresponding to the specified image In. The two-dimensional code qn has embedded access information (a URL, an IP address, etc.) for access to the contents registration/distribution apparatus 400 and unique identification information for identification of each two-dimensional code qn. The album generation unit 12 arranges the image In on each page configuring the album 500 according to a specified layout, arranges the issued two-dimensional code qn near the corresponding image In, generates print data for printing on the printer 200, and outputs the generated data on the printer 200. The printer 200 generates the album 500 by printing the image In and the two-dimensional code qn on various print media such as TA paper, etc. based in the print data. The code issue unit 11 and the album generation unit 12 as programs are stored in the storage unit 4, and are stored on the storage medium 3b such as CD-ROM, etc., and can be appropriately read from the media reader 3a to the processing unit 1 to the storage unit 4.

Figure 2:
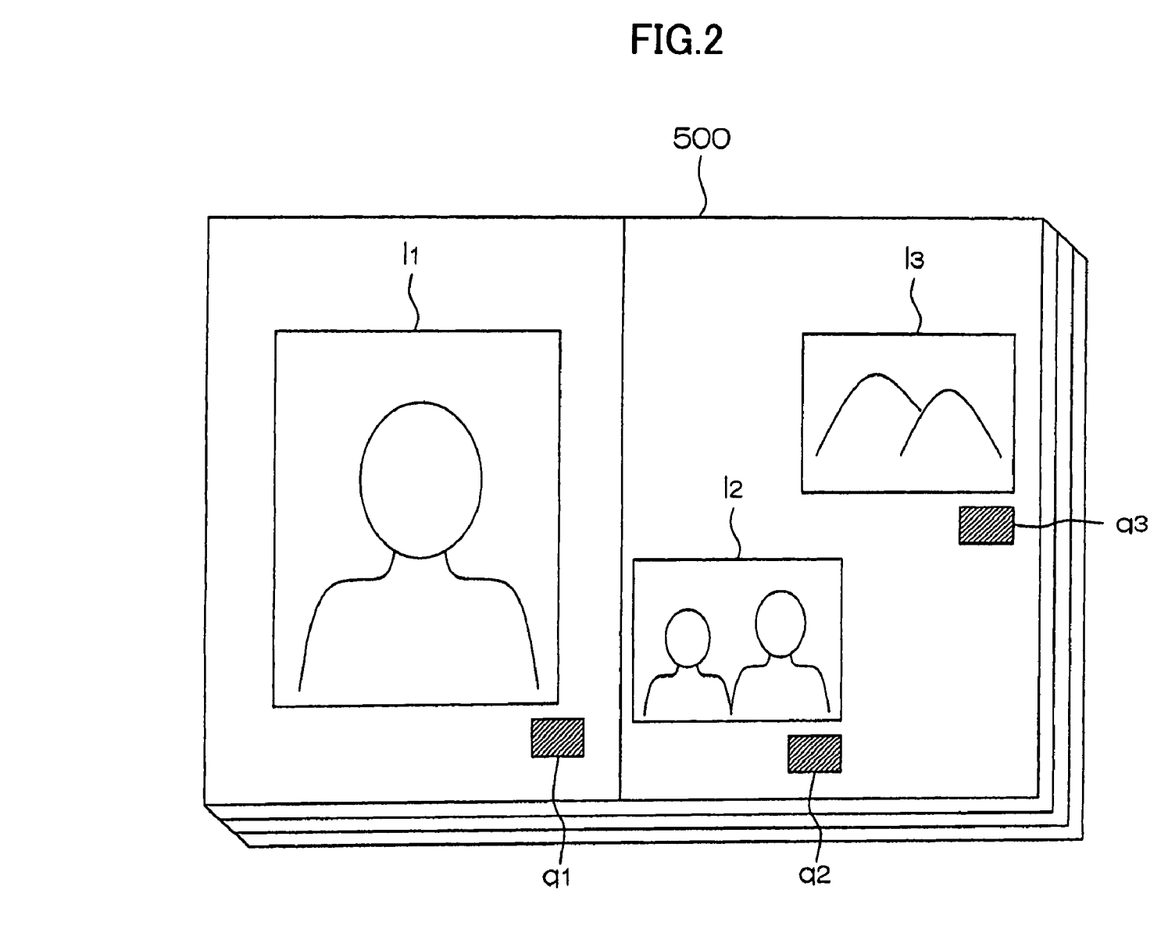
FIG. 2 shows the appearance of an album.

FIG. 2 shows the appearance of the album 500 printed on the printer 200. In FIG. 2, a page of the album 500 is exemplified as a published album. Near each of the images I1 to I3, the two-dimensional codes q1 to q3 are arranged. Unique pieces of identification information r1 to r3 are embedded in the q1 to q3 respectively. The identification information rn can be read by the code reader 300a or 300b.

Figure 3:
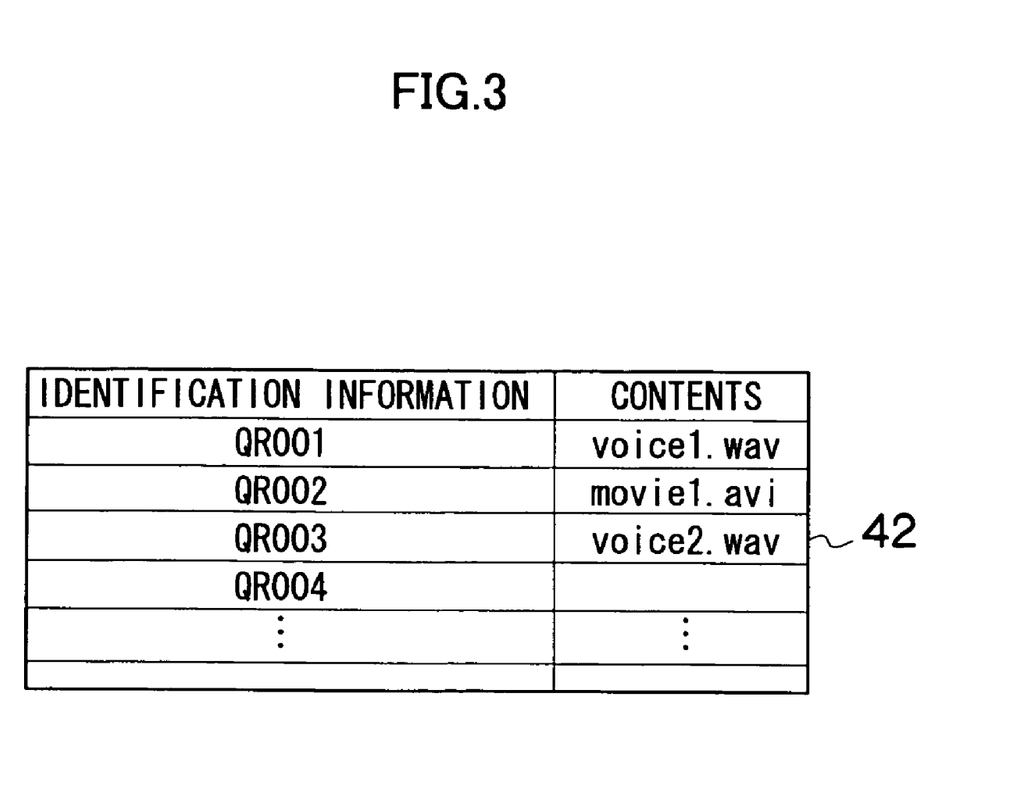
FIG. 3 is an explanatory view showing the concept of the information stored in a contents DB.

By referring to FIG. 1 again, the contents registration/distribution apparatus 400 comprises a registration unit 41, a contents DB 42, and a distribution unit 43. When the mobile telephone 300 reads the two-dimensional code qn in which the identification information rn (n=1, 2, . . . ) is embedded, and gain access, the registration unit 41 accepts the registration of the contents such as voice, moving pictures, a static image, etc. corresponding to the identification information rn notified from the mobile telephone 300. The registered contents are stored in the contents DB 42 as associated with the identification information rn. FIG. 3 shows the concept of the state in which the identification information rn is associated with registered contents and stored in the contents DB 42. In this example, the contents are expressed as a WAV format file recording voice, but the contents is not limited to voice, but can be a moving picture file, a static image file, a text file, a hypertext file, etc. On the other hand, when the mobile telephone 300 reads a two-dimensional code qn and gains access, the distribution unit 43 distributes the contents corresponding to the identification information rn embedded in the two-dimensional code qn to the mobile telephone 300. For example, when contents are voice, the voice on a phone is distributed over a mobile communication network, or the distribution unit 43 converts the contents to a format (for example, an application in which moving pictures, a static image, voice, and a character is regenerated when performed by the mobile telephone 300) executable by the mobile telephone 300, and can distribute the resultant data to the mobile telephone 300. When contents are distributed as voice on a telephone, the contents registration/distribution apparatus 400 can be configured by a well-known CTI (computer telephony integration) server.

[Flow of Process]

Described below is the flow of the process performed between the mobile telephone 300 and the contents registration/distribution apparatus 400. First, based on the flowchart shown in FIG. 4, the flow of the contents registering process is explained. In this process, the contents transmitted from the mobile telephone 300a are registered in the contents DB 42.

Figure 4:
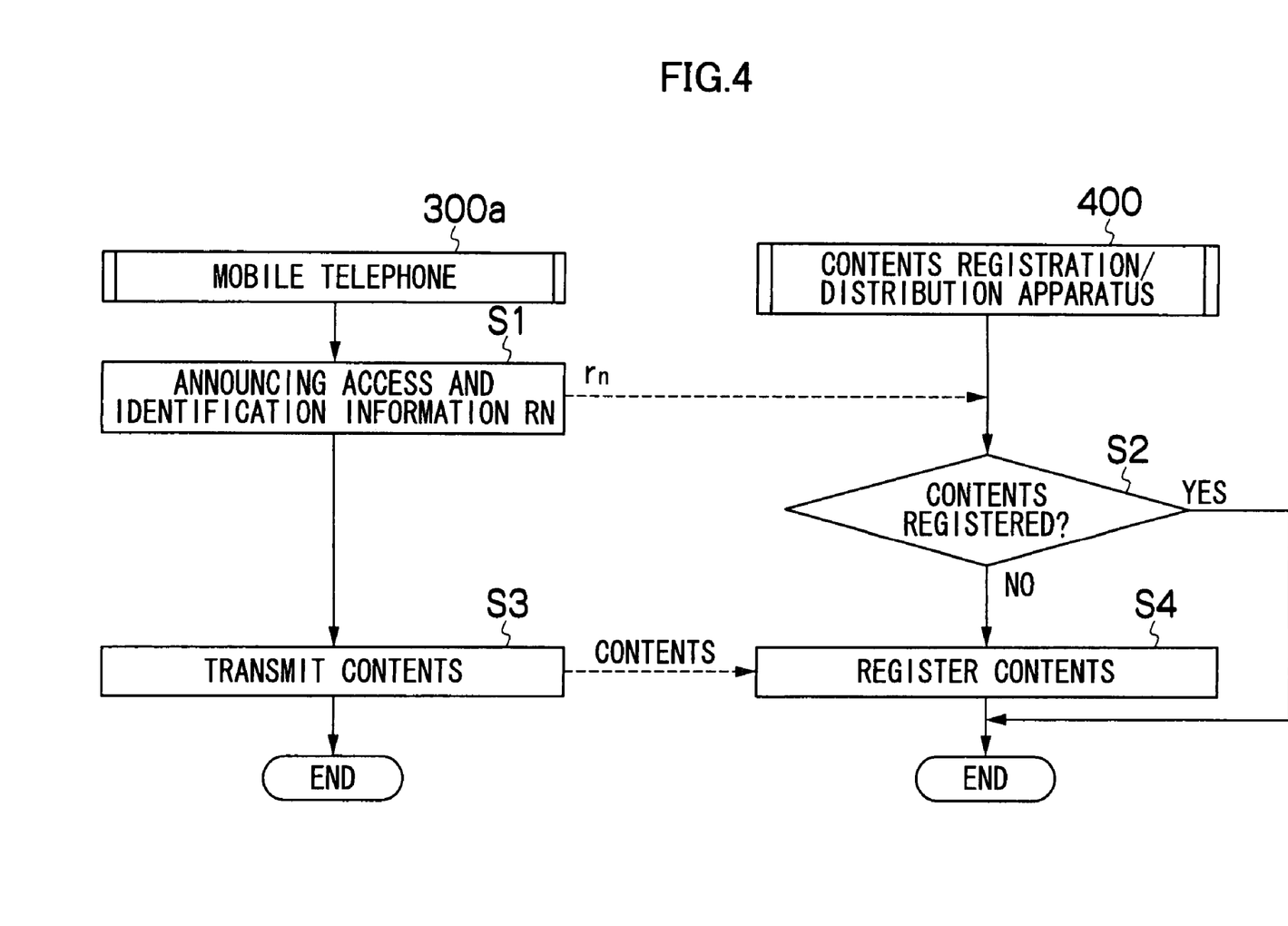
FIG. 4 is a flowchart of the contents registering process.

The mobile telephone 300a accesses the contents registration/distribution apparatus 400 by reading access information from the two-dimensional code qn printed on the album 500 by the code reader 300a, reads the identification information rn embedded in the two-dimensional code qn, and notifies the contents registration/distribution apparatus 400 of the information (S1). The registration unit 41 determines whether or not the contents corresponding to the identification information rn notified by the mobile telephone 300a have been registered in the contents DB 42 (S2). If they have not been registered, the storage area for registration of the contents corresponding to the identification information rn is reserved in the contents DB 42. If the contents are registered, the process terminates.

After reserving the storage area for registration of contents, the mobile telephone 300a transmits desired contents to the contents registration/distribution apparatus 400 (S3). For example, when the contents are voice, the voice on the phone transmitted over a mobile communication network is transmitted as contents. Otherwise, when the contents are text, the text data or hypertext data describing the text is transmitted. When the contents are static images or moving pictures, a static image or moving picture file is transmitted. The registration unit 41 associates the identification information rn notified by the mobile telephone 300a with the received contents, and stores them in the contents DB 42 (S4).

In the above-mentioned process, after receiving a provided album 500, a user of the mobile telephone 300a can freely register desired contents as associated with a desired image. Once registered contents can be changed any number of times by performing the above-mentioned process again, and the number of times of changing a process can be restricted. Additionally, any contents can be registered. For example, information about a subject or the situation at pickup time of a specific image can be registered as an audio memo, etc. Otherwise, when an image is a picture of the wedding party of a friend of a user, the voice or text of the compliment to the friend can be registered.

Figure 5:
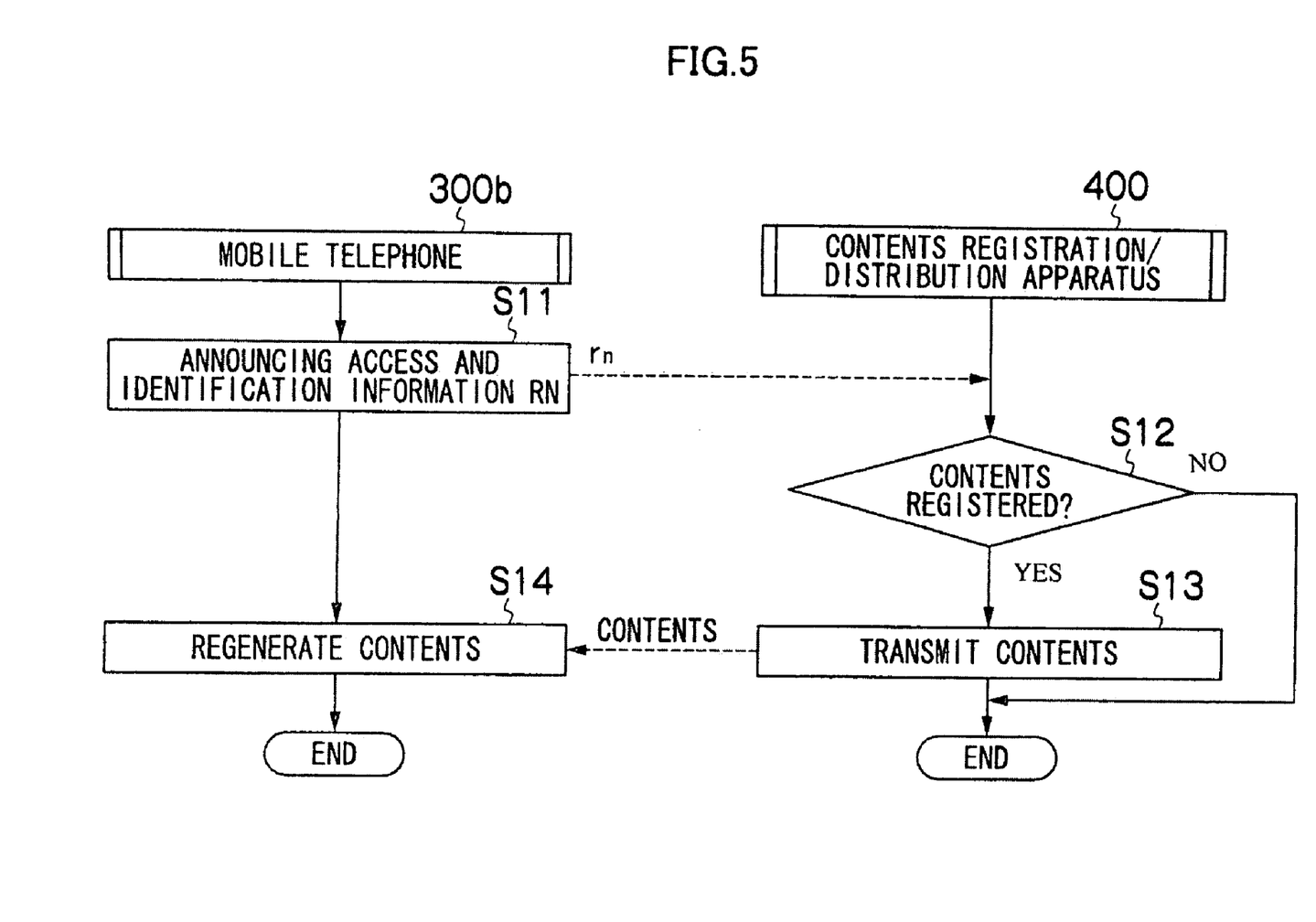
FIG. 5 is a flowchart of the contents distributing process.

The flow of the contents distributing process is explained below by referring to the flowchart shown in FIG. 5. In this process, the contents registered in the contents DB 42 are transmitted to the mobile telephone 300b.

When the mobile telephone 300b accesses the contents registration/distribution apparatus 400 by reading by the code reader 300b the access information embedded in the two-dimensional code qn arranged near the image In printed on the album 500, the identification information rn embedded in the two-dimensional code qn is announced to the contents registration/distribution apparatus 400 (S11).

The distribution unit 43 determines whether or not the contents corresponding to the identification information rn announced by the mobile telephone 300b has been registered in the contents DB 42 (S12). If it has been registered, control is passed to S13. If not, the process terminates.

The distribution unit 43 designates from the contents DB 42 the contents corresponding to the identification information rn announced by the accessing mobile telephone 300b. The distribution unit 43 distributes the designated contents to the mobile telephone 300b (S13). The mobile telephone 300b regenerates the distributed contents (S14). For example, when the contents are stored as a voice file in the contents DB 42, the distribution unit 43 regenerates voice from the voice file, and transmits the regenerated voice to the mobile telephone 300. If the contents are moving pictures or static images, the distribution unit 43 transmits to the mobile telephone 300b a moving picture file or a static image file executable by the mobile telephone 300b.

In the above-mentioned process, the user of the mobile telephone 300b receiving the provided album 500 can distribute the contents registered as associated with an image at any time by reading the two-dimensional code arranged near the image by the mobile telephone 300b. A person who receives the distribution of contents can be the person who registered his or her voice, or any other person. For example, when the voice memo is used, the information about the subject of an image and the pickup situation can be confirmed by the person who registered his or her voice listen to the voice. When the voice or text of the compliment at the wedding party is registered through the mobile telephone 300a as described above, the compliment registered through the mobile telephone 300b of a friend can be presented together with the image by the person who registered the voice or text providing the album 500 for the friend.

Second Embodiment

[General Configuration]

Figure 6:
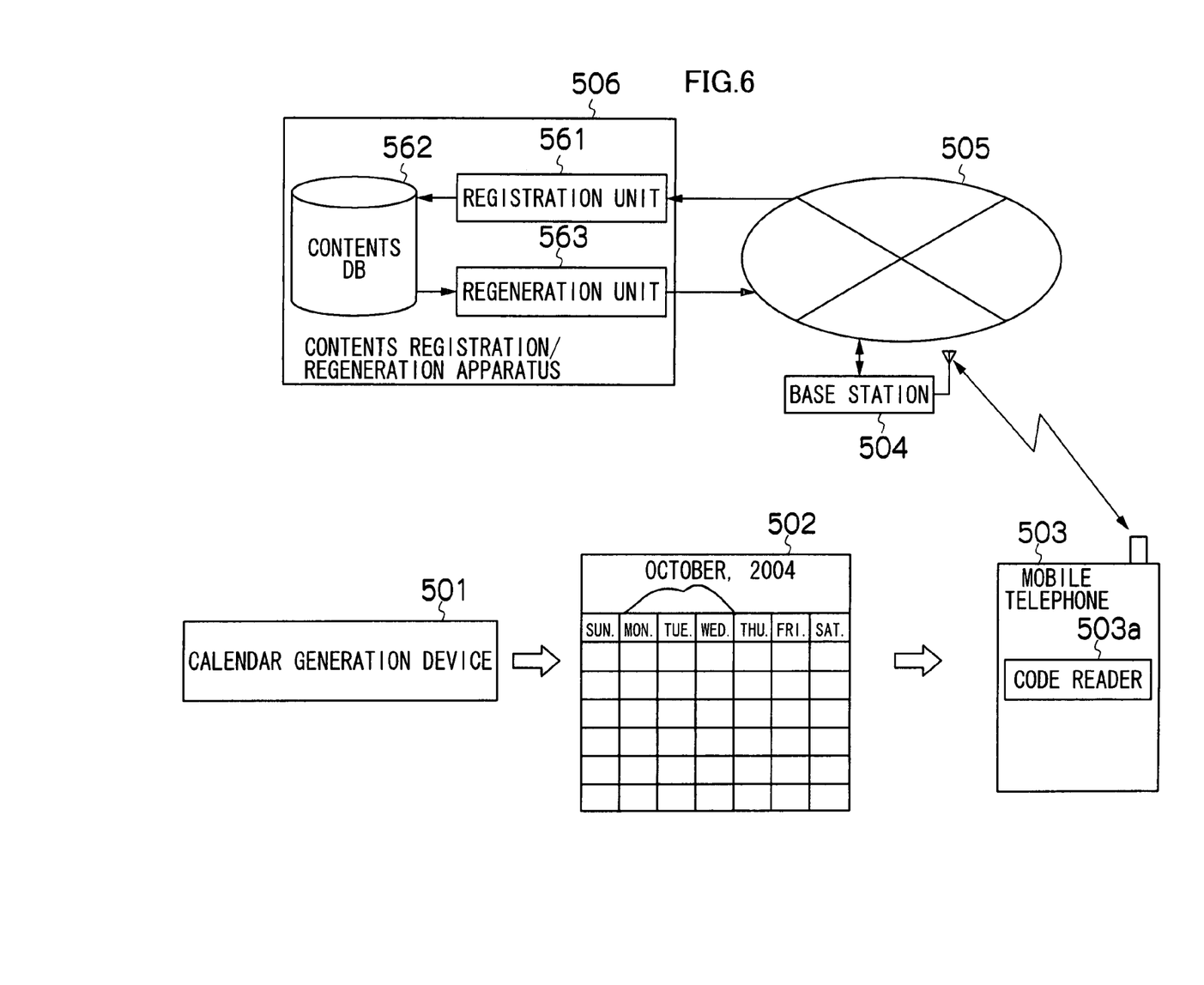
FIG. 6 shows the configuration of the general functions of the calendar providing system with the function of registering/regenerating contents.

FIG. 6 shows the configuration of the general functions of the calendar providing system with the function of registering/regenerating contents according to a preferred embodiment of the present invention. The system is provided with a calendar generation device 501 and a contents registration/regeneration apparatus 506. The contents registration/regeneration apparatus 506 is connected to a mobile telephone 503 through a network 505 such as the Internet and a base station 504 of a mobile telephone communication network. The mobile telephone 503 can read a two-dimensional registration code and a two-dimensional regeneration code printed on a calendar 502 by a code reader 503a to access the contents registration/regeneration apparatus 506. The calendar 502 is generated by the calendar generation device 501, and the completed calendar 502 is provided for a user with or without charge.

Figure 7:
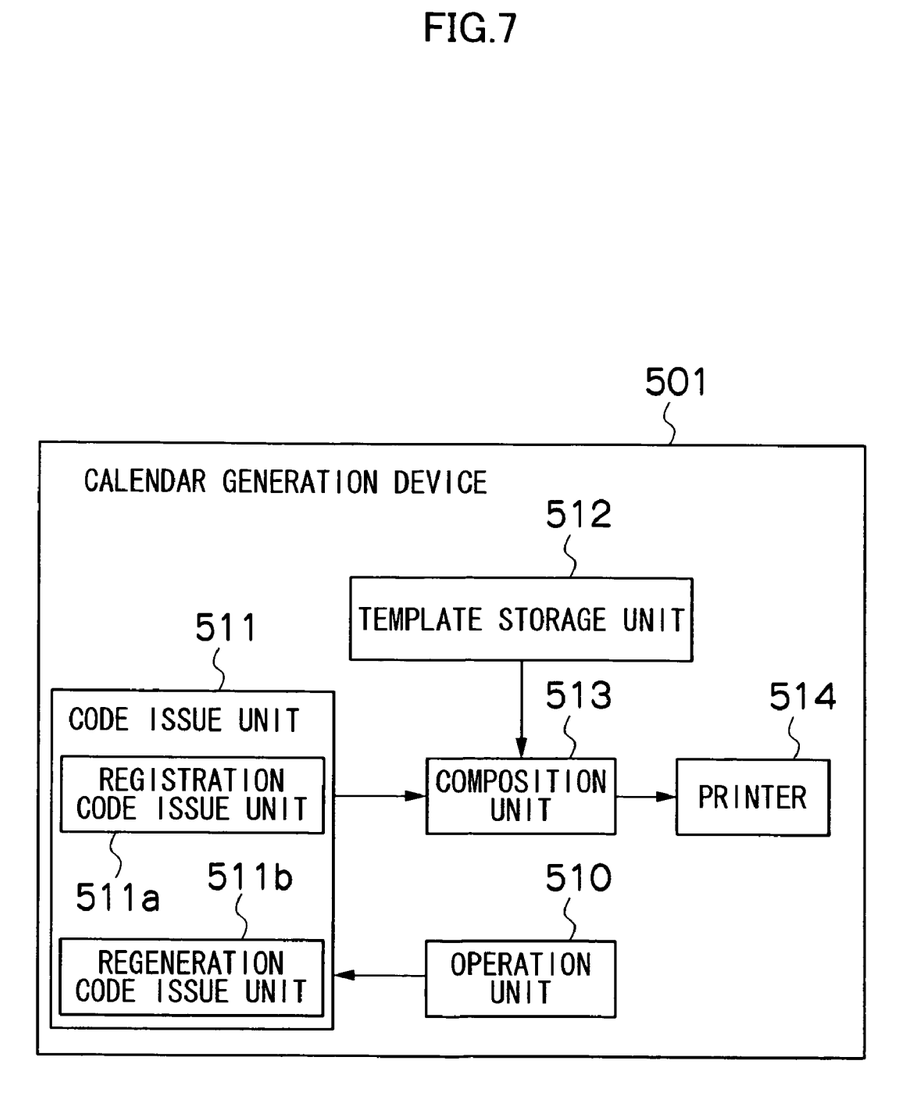
FIG. 7 shows the configuration of the general functions of the calendar generation device.

FIG. 7 shows the configuration of the general functions of the calendar generation device 501. The calendar generation device 501 is provided with an operation unit 510 configured by a pointing device, etc., a code issue unit 511, a template storage unit 512, a composition unit 513, and a printer 514. The template storage unit 512 stores a template image for printing a calendar of a predetermined year in a predetermined language. The registration code issue unit 51 1a of the code issue unit 511 issues a registration code as a two-dimensional code in which the information for access to a registration unit 561 of the contents registration/regeneration apparatus 506 is embedded. A regeneration code issue unit 511b of the code issue unit 511 issues a regeneration code as a two-dimensional code in which the information for access to a regeneration unit 563 of the contents registration/regeneration apparatus 506. A registration code and a regeneration code are issued in a pair corresponding to the year, month, or day (including day of week). The composition unit 513 composes a pair of registration code and regeneration code issued corresponding to the year, month, or day (including day of week) by arranging them corresponding to the year, month, or day of a template image for printing a calendar. The printer 514 generates the calendar 502 by printing the composed image on a printing medium such as TA paper, etc.

Figure 8:
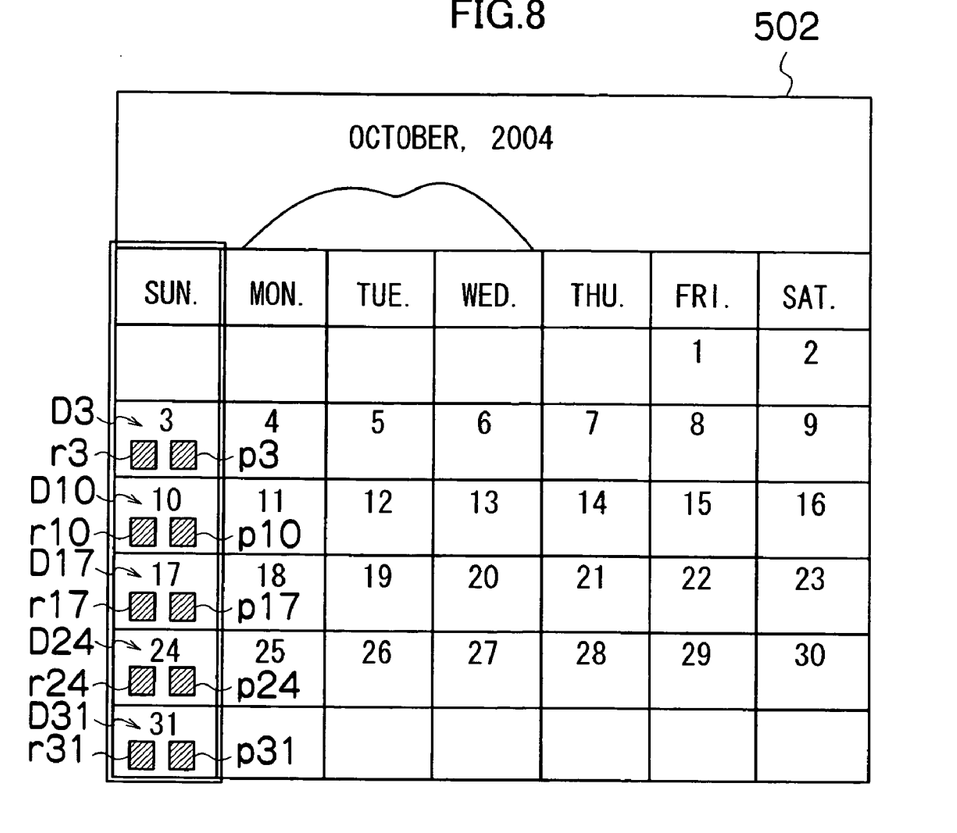
FIG. 8 shows an example of the appearance of a calendar.

FIG. 8 illustrates the appearance of the calendar 502. In FIG. 8, a calendar page of October, 2004 forming part of the calendar 502 is shown as an example. In this example, in the date of a predetermined year, a pair of registration code rn and regeneration code pn corresponding to each day is arranged and printed in the date arrangement column Dn for Sunday (n=3, 10, 17, 24, 31). In FIG. 8, pairs of registration code rn and regeneration code pn are printed only in the date arrangement column for Sunday, but a pair of registration code rn and regeneration code pn can be printed for an optional date specified by the operation unit 510. If there is no restriction on cost, a pair of registration code rn and regeneration code pn corresponding to all days can be printed.

By referring to FIG. 6 again, the contents registration/regeneration apparatus 506 is provided with the registration unit 561, a contents DB 562, and the regeneration unit 563. When the mobile telephone 503 gains access by reading the registration code rn corresponding to a specific date, the registration unit 561 accepts the registration of contents such as voice, moving pictures, static images, etc. corresponding to the date transmitted from the mobile telephone 503. The registered contents are stored in the contents DB 562 as associated with the date.

Figure 9:
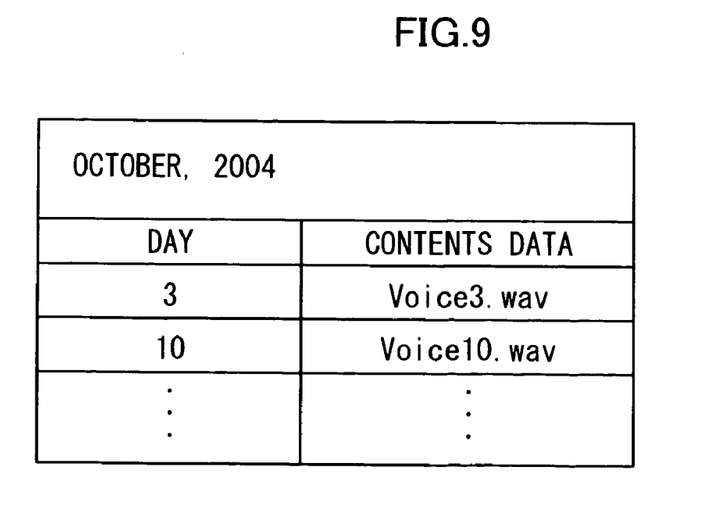
FIG. 9 is an explanatory view showing the concept of the information stored in a contents DB.

FIG. 9 is an explanatory view showing the concept of a date associated with contents and stored in the contents DB 562. When the mobile telephone 503 gains access by reading the regeneration code pn corresponding to a specific date, the regeneration unit 563 transmits to the mobile telephone 503 the data obtained by regenerating the contents corresponding to the date. For example, when the contents are voice, regenerated voice on a phone is transmitted over a mobile communication network. The regeneration unit 563 does not only transmit the regenerated data itself, but can also transmit to the mobile telephone 503 after converting the contents into a format to be regenerated by the mobile telephone 503 (for example, an application in which moving pictures, static images, and voice can be regenerated by performing a process by a mobile telephone). When the contents are voice, the contents registration/regeneration apparatus 506 can be configured by a well-known CTI (computer telephony integration) server.

[Flow of Process]

Described below is the flow of the process performed between the mobile telephone 503 and the contents registration/regeneration apparatus 506. First the flow of the contents regenerating process is explained by referring to the flowchart shown in FIG. 10.

Figure 10:
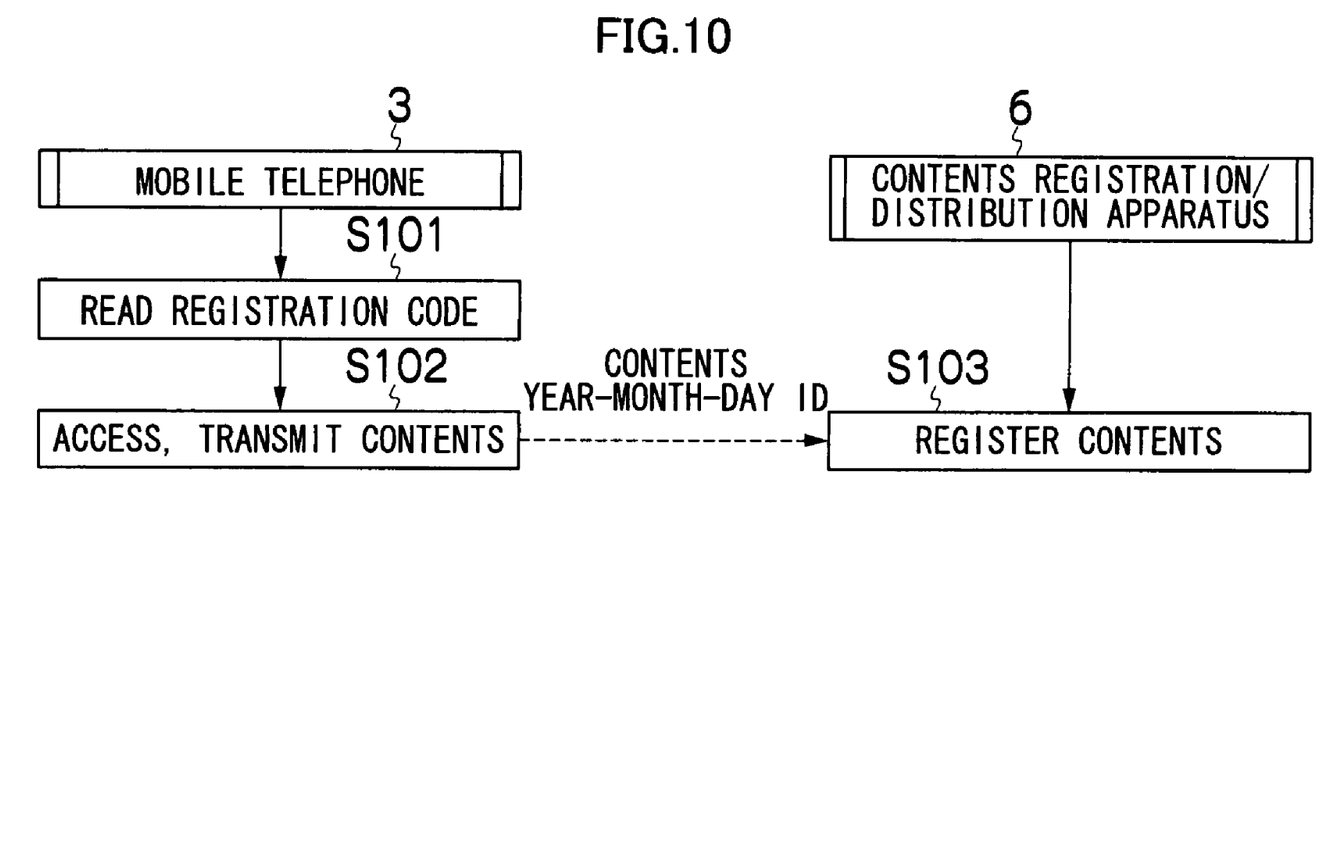
FIG. 10 is a flowchart of the contents registering process.

By the mobile telephone 503 reading using the code reader 503a the registration code rn corresponding to a specific date printed on the calendar 502 (S101), it accesses the registration unit 561(S102). The mobile telephone 503 transmits desired contents to the registration unit 561. For example, when the contents are voice, the voice on a phone transmitted through the mobile communication network is defined as contents. When the contents are text, text data is transmitted. When the contents are static images or moving pictures, a static image file or a moving picture file is transmitted. The mobile telephone 503 notifies the registration unit 561 of the information (hereinafter referred to as a year-month-day ID) uniquely indicating the year, month, and day corresponding to the read registration code rn when the contents are transmitted. The mobile telephone 503 can also transmit the information about a user ID, etc. The registration unit 561 associates the year-month-day ID received from the mobile telephone 503 with the received contents, and stores them in the contents DB 562 (S103).

In the above-mentioned process, the user who received the calendar 502 can freely register desired contents corresponding to a desired year, month, and day. Once registered contents can be changed at any number of times by performing again the above-mentioned process, and the number of times of changes can be restricted. Furthermore, registered contents can be optionally defined. For example, the information about a baseball match to be held on Oct. 3, 2004 can be registered as a voice memo, or the voice or text information as a compliment can be registered when a wedding party of a friend is to be held on Oct. 10, 2004.

Figure 11:
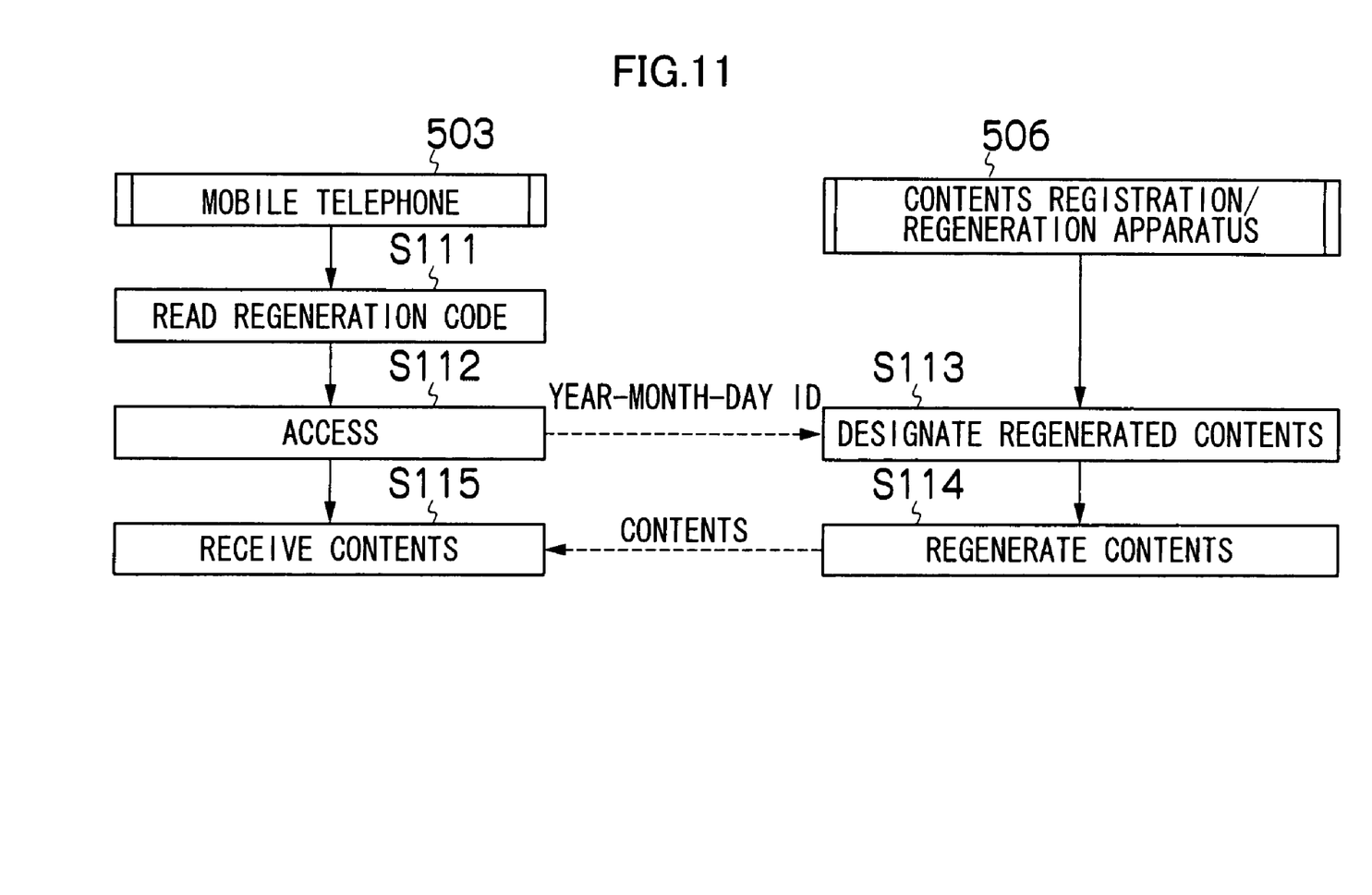
FIG. 11 is a flowchart of the contents regenerating process.

Next, the flow of the contents regenerating process is explained below by referring to the flowchart shown in FIG. 11.

The mobile telephone 503 reads a regeneration code pn corresponding to a specific date printed on the calendar 502 (S111) by the code reader 503a, and accesses the regeneration unit 563 (S112). At this time, the mobile telephone 503 notifies the regeneration unit 563 of the year-month-day ID uniquely indicating the year, month, and day corresponding to the read regeneration code pn. The mobile telephone 503 can notify the information such as a user ID, etc.

The regeneration unit 563 designates from the contents DB 562 the contents corresponding to the year-month-day ID received from the accessing mobile telephone 503 (S113). Then, the regeneration unit 563 regenerates the designated contents and transmits them to the mobile telephone 503 (S114), and the mobile telephone 503 receives the regenerated contents (S115). For example, when the contents are stored as a voice file in the contents DB 562, the regeneration unit 563 regenerates voice from the voice file, and transmits it as voice to the mobile telephone 503. When the contents are moving pictures or static images, the regeneration unit 563 can transmit to the mobile telephone 503 a moving picture file or a static image file extractable by the mobile telephone 503.

In the above-mentioned process, a user who receives the calendar 502 can receive the regeneration of contents registered corresponding to the year, month, and day at any time. A person who receives regenerated contents can be a person who registered the voice, or any other person. For example, in the above-mentioned voice memo, the schedule of a day can be confirmed by listening to the voice by the person who registered the voice. When the voice or text of a compliment is registered at a wedding party as described above, the person who registered the compliment can transmit the voice or text of the compliment to a mobile telephone 503 held by a friend by presenting the calendar 502 from the person who registered the voice or text to the friend.

What is claimed is:

1. A calendar providing system with a function of registering and regenerating contents, comprising:
   a contents registration/regeneration apparatus connected to a device via a network comprising:
      a registration unit which, in response to receiving digital contents and corresponding date information from the device, registers the contents in association with the corresponding date information in a database, wherein the date information uniquely identifies at least one of a year, month, and day to be associated with each of the registered contents, and
      a regeneration unit which, in response to receiving the date information from the device after the contents are registered, transmits the registered contents to the device, the registered contents being regenerated before or after being transmitted to the device; and
   a calendar generation apparatus comprising:
      a two-dimensional registration code issue unit which issues a two-dimensional registration code in which is embedded: access destination information causing the device to access the registration unit via the network, and the date information,
      a two-dimensional regeneration code issue unit which issues a two-dimensional regeneration code in which is embedded access destination information causing the device to access the regeneration unit via the network, and
      a print unit which prints a calendar in which the two-dimensional registration code and the two-dimensional regeneration code are printed in an area of the calendar corresponding to the at least one of a year, month, and day uniquely identified in the date information, wherein the date information received by the registration unit and regeneration unit from the device are each obtained by the device as a result of optically reading the two-dimensional registration code and the two-dimensional regeneration code from the calendar, respectively.

2. The calendar providing system with the function of registering/regenerating contents according to claim 1, wherein the contents are audio.

3. A calendar generation apparatus which generates a calendar in which access destination information pointing to a contents registration/regeneration apparatus comprising a registration unit which accepts registration of digital contents corresponding to date information uniquely identifying at least one of a year, month, and day, and a regeneration unit which regenerates contents registered corresponding to the date information is embedded, comprising:

- a two-dimensional registration code issue unit which issues a two-dimensional registration code in which is embedded: access destination information causing a device to the access the registration unit via a network, and the date information;
- a two-dimensional regeneration code issue unit which issues a two-dimensional regeneration code in which is embedded access destination information causing the device to access the regeneration unit via the network; and
- a print unit which prints a calendar in which the two-dimensional registration code and the two-dimensional regeneration code are printed in an area of the calendar corresponding to the at least one of a year, month, and day uniquely identified in the date information, wherein the registration unit and regeneration unit receive date information from the device which are obtained by the device, respectively, as a result of optically reading the two-dimensional registration code and the two-dimensional regeneration code from the calendar.

4. A calendar generating method which generates a calendar in which access destination information pointing to a contents registration/regeneration apparatus comprising a registration unit which accepts registration of digital contents corresponding to date information uniquely identifying at least one of a year, month, and day, and a regeneration unit which regenerates contents registered corresponding to the date information is embedded, comprising:

- a two-dimensional registration code issuing step of issuing a two-dimensional registration code in which is embedded: access destination information causing a device to access the registration unit via a network, and the date information;
- a two-dimensional regeneration code issuing step of issuing a two-dimensional regeneration code in which is embedded access destination information causing the device to access the regeneration unit of the contents registration/regeneration apparatus; and
- a printing step of printing a calendar in which the two-dimensional registration code and the two-dimensional regeneration code are printed in an area of the calendar corresponding to the at least one of a year, month, and day uniquely identified in the date information, wherein the registration unit and regeneration unit receive date information from the device which are obtained by the device, respectively, as a result of optically reading the two-dimensional registration code and the two-dimensional regeneration code from the calendar.

5. A calendar generation program used to direct a computer to generate a calendar in which access destination information pointing to a contents registration/regeneration apparatus comprising a registration unit which accepts registration of digital contents corresponding to date information uniquely identifying at least one of a year, month, and day, and a regeneration unit which regenerates contents registered corresponding to the date information is embedded, comprising:

- a two-dimensional registration code issuing step of issuing a two-dimensional registration code in which is embedded: access destination information causing a device to access the registration unit;
- a two-dimensional regeneration code issuing step of issuing a two-dimensional regeneration code in which is embedded: access destination information causing the device to access the regeneration unit of the contents registration/regeneration apparatus; and
- a printing step of printing a calendar in which the two-dimensional registration code and a two-dimensional regeneration code are printed in an area of the calendar corresponding to the at least one of a year, month, and day uniquely identified in the date information;

wherein the registration unit and regeneration unit receive date information from the device which are obtained by the device, respectively, as a result of optically reading the two-dimensional registration code and the two-dimensional regeneration code from the calendar.

* * * * *